(12) United States Patent
Luus et al.

(10) Patent No.: US 11,494,634 B2
(45) Date of Patent: Nov. 8, 2022

(54) OPTIMIZING CAPACITY AND LEARNING OF WEIGHTED REAL-VALUED LOGIC

(71) Applicant: International Business Machines Corporation, Armonk, NY (US)

(72) Inventors: Francois Pierre Luus, Wierdapark (ZA); Ryan Nelson Riegel, Carrollton, GA (US); Ismail Yunus Akhalwaya, Emmarentia (ZA); Naweed Aghmad Khan, Johannesburg (ZA); Etienne Eben Vos, Johannesburg (ZA); Ndivhuwo Makondo, Pretoria (ZA)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 15/931,223

(22) Filed: May 13, 2020

(65) Prior Publication Data

US 2021/0357738 A1 Nov. 18, 2021

(51) Int. Cl.
*G06N 3/08* (2006.01)
*G06N 3/04* (2006.01)

(52) U.S. Cl.
CPC ............. *G06N 3/08* (2013.01); *G06N 3/0481* (2013.01)

(58) Field of Classification Search
CPC ......... G06N 3/08; G06N 3/0481; G06N 20/00
(Continued)

(56) References Cited

U.S. PATENT DOCUMENTS 5,226,092 A * 7/1993 Chen ...................... G06N 3/063
382/157
2014/0379624 A1 12/2014 Piekniewski et al.
(Continued)

FOREIGN PATENT DOCUMENTS

CN 1182246 A 5/1998
CN 104463330 A 3/2015
(Continued)

OTHER PUBLICATIONS

International Search Report dated Jul. 15, 2021 issued in PCT/IB2021/053030, 7 pages.
(Continued)

*Primary Examiner* — Emmanuel Bayard
(74) *Attorney, Agent, or Firm* — Scully, Scott, Murphy & Presser, P.C.; Shimon Benjamin

(57) ABSTRACT

Maximum expressivity can be received representing a ratio between maximum and minimum input weights to a neuron of a neural network implementing a weighted real-valued logic gate. Operator arity can be received associated with the neuron. Logical constraints associated with the weighted real-valued logic gate can be determined in terms of weights associated with inputs to the neuron, a threshold-of-truth, and a neuron threshold for activation. The threshold-of-truth can be determined as a parameter used in an activation function of the neuron, based on solving an activation optimization formulated based on the logical constraints, the activation optimization maximizing a product of expressivity representing a distribution width of input weights to the neuron and gradient quality for the neuron given the operator arity and the maximum expressivity. The neural network of logical neurons can be trained using the activation function at the neuron, the activation function using the determined threshold-of-truth.

20 Claims, 10 Drawing Sheets

(58) Field of Classification Search
USPC ............. 375/240.12, 240.16, 240.29; 706/25
See application file for complete search history.

(56) References Cited

U.S. PATENT DOCUMENTS

| | | | |
|---|---|---|---|
| 2015/0106315 A1 | 4/2015 | Birdwell et al. | |
| 2015/0106316 A1* | 4/2015 | Birdwell | G06N 3/086 |
| | | | 706/33 |
| 2018/0121796 A1 | 5/2018 | Deisher et al. | |
| 2018/0174033 A1* | 6/2018 | Davies | G06N 3/08 |
| 2019/0130246 A1 | 5/2019 | Katayama | |
| 2019/0236440 A1 | 8/2019 | Ho et al. | |
| 2021/0012211 A1* | 1/2021 | Sikka | G06N 3/0481 |
| 2021/0064954 A1* | 3/2021 | Choi | G06N 3/0454 |
| 2021/0103804 A1* | 4/2021 | Turbiner | G06F 17/15 |
| 2021/0304009 A1* | 9/2021 | Bazarsky | G06N 3/06 |
| 2021/0365817 A1* | 11/2021 | Riegel | G06N 5/042 |

FOREIGN PATENT DOCUMENTS

| | | |
|---|---|---|
| CN | 109871940 A | 6/2019 |
| CN | 110610235 A | 12/2019 |
| WO | 2019/075267 A1 | 4/2019 |

OTHER PUBLICATIONS

Wan, F., et al. "A Neural Network with Logical Reasoning Based on Auxiliary Inputs", Frontiers in Robotics and AI, Jul. 30, 2018, pp. 1-12, vol. 5, Article 86.

Liu, S., et al. "Gradient Descent using Stochastic Circuits for Efficient Training of Learning Machines", IEEE Transactions on Computer-Aided Design of Integrated Circuits and Systems, Oct. 16, 2018, pp. 1-13.

Goh, G., "Why Momentum Really Works," Distill, http://doi.org/10.23915/distill.00006, Apr. 4, 2017, 23 pages.

Goyal, M., et al. "Learning Activation Functions: A new paradigm for understanding Neural Networks", Proceedings of Machine Learning Research 101, Jul. 8, 2019, pp. 1-18.

Raghu, M., et al. "On the Expressive Power of Deep Neural Networks", Proceedings of the 34th International Conference on Machine Learning, Jun. 18, 2017, 24 pages.

International Search Report dated Jun. 18, 2021 issued in PCT/IB2021/052265, 7 pages.

Dong et al., "Neural logic machines." Published conference paper at ICLR 2019, arXiv preprint arXiv:1904.11694 (2019) Apr. 26, 2019, pp. 1-22.

Evans et al., "Learning explanatory rules from noisy data." Journal of Artificial Intelligence Research 61 (2018): Jan. 25, 2018, pp. 1-64.

Garcez et al., "The connectionist inductive learning and logic programming system." Applied Intelligence 11.1 (Jan. 13, 1999): pp. 59-77.

Pinkas, "Reasoning, nonmonotonicity and learning in connectionist networks that capture propositional knowledge." Artificial Intelligence 77.2 (1995) Sep. 1995: pp. 203-247.

Richardson et al., "Markov logic networks." Machine learning 62.1-2 (2006): published online Jan. 27, 2006, pp. 107-136.

Rocktäschel et al, "Learning knowledge base inference with neural theorem provers." Proceedings of the 5th Workshop on Automated Knowledge Base Construction. 2016, Jun. 12-17, 2016, pp. 45-50.

Serafini et al., "Logic tensor networks: Deep learning and logical reasoning from data and knowledge." arXiv preprint arXiv:1606.04422 (2016), Jul. 7, 2016, 12 pages.

Towell et al., "Knowledge-based artificial neural networks." Artificial intelligence 70.1-2 (Aug. 1994): pp. 119-165.

Tran, "Propositional knowledge representation and reasoning in restricted boltzmann machines." arXiv preprint arXiv:1705.10899 (2017), May 29, 2018, 10 pages.

Yang et al., "Differentiable learning of logical rules for knowledge base reasoning." 31st Conference on Nueral Information Processing Systems (NIPS 2017), Long Beach, CA, USA, Advances in Neural Information Processing Systems. 2017, Dec. 4-9, 2017, 10 pages.

List of IBM Patents or Patent Applications Treated as Related, dated Nov. 2, 2020, 2 pages.

\* cited by examiner

OPTIMIZING CAPACITY AND LEARNING OF WEIGHTED REAL-VALUED LOGIC

CROSS-REFERENCE TO RELATED APPLICATIONS

This application is related to commonly-owned, U.S. Provisional Application No. 63/024,243 entitled, "FIRST-ORDER LOGICAL NEURAL NETWORKS WITH BIDIRECTIONAL INFERENCE", filed on even date, the entire content and disclosure of which is expressly incorporated by reference herein as if fully set forth herein.

BACKGROUND

The present application relates generally to computers and computer applications, and more particularly to neural networks and neuro-symbolic networks.

Artificial intelligence methodologies include principled, deductive inference via any of various systems of formal logic, and data-driven, gradient optimized neural networks. Both paradigms bear a number of strengths and weaknesses. For example, formal logic is interpretable, verifiable, and broadly generalizable, though it is computationally intensive, requires extensive domain expert input, and can be derailed by inconsistencies. Neural networks, on the other hand, perform well even for unprocessed and/or noisy data, require little human configuration, and can run efficiently in parallel. Neural networks, however, may need large training data sets, may be vulnerable to adversarial attacks, and can have uninterpretable black-box characteristic.

BRIEF SUMMARY

A method of learning of weighted real-valued logic implemented in a neural network of logical neurons, in an aspect, can include receiving maximum expressivity representing a ratio between maximum and minimum input weights to a neuron of a neural network implementing a weighted real-valued logic gate. The method can also include receiving operator arity associated with the neuron. The method can further include defining logical constraints associated with the weighted real-valued logic gate in terms of weights associated with inputs to the neuron, a threshold-of-truth, and a neuron threshold for activation. The method can also include determining the threshold-of-truth as a parameter used in an activation function of the neuron, based on solving an activation optimization formulated based on the logical constraints. The activation optimization maximizes a product of, expressivity representing a distribution width of input weights to the neuron and gradient quality for the neuron, given the operator arity and the maximum expressivity. The method can also include training the neural network of logical neurons using the activation function at the neuron, the activation function using the determined threshold-of-truth.

A system, in one aspect, can include a hardware processor. A memory device can be coupled with the hardware processor. The hardware processor can be configured to receive maximum expressivity representing a ratio between maximum and minimum input weights to a neuron of a neural network implementing a weighted real-valued logic gate. The hardware processor can also be configured to receive operator arity associated with the neuron. The hardware processor can also be configured to define logical constraints associated with the weighted real-valued logic gate in terms of weights associated with inputs to the neuron, a threshold-of-truth, and a neuron threshold for activation. The hardware processor can also be configured to determine the threshold-of-truth as a parameter used in an activation function of the neuron, based on solving an activation optimization. The activation optimization can be formulated based on the logical constraints. The activation optimization maximizes a product of, expressivity representing a distribution width of input weights to the neuron and gradient quality for the neuron, given the operator arity and the maximum expressivity. The hardware processor can also be configured to train the neural network of logical neurons using the activation function at the neuron, the activation function using the determined threshold-of-truth.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
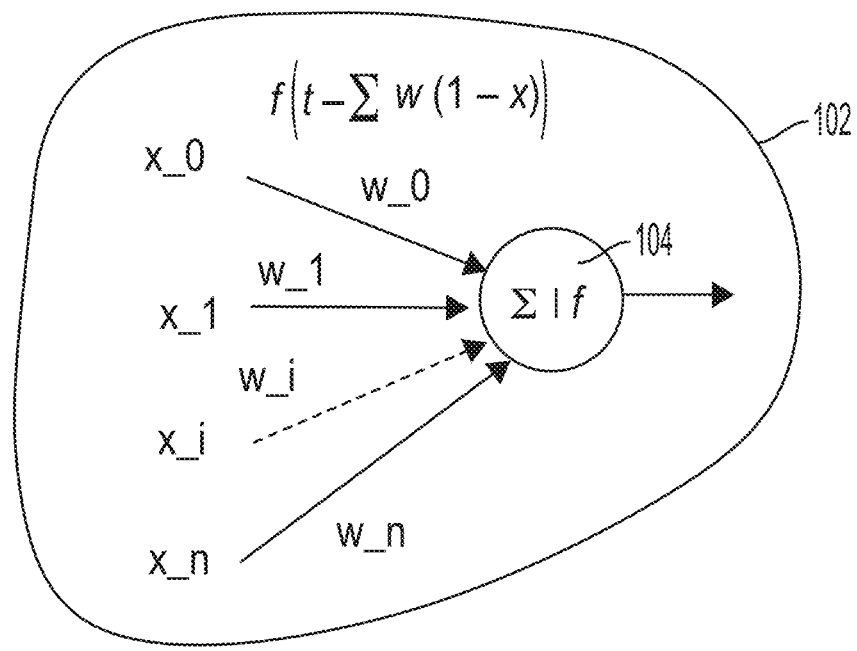
FIG. 1 illustrates a neuron in a network of neurons in an embodiment.

Systems, methods and techniques are presented, which can determine various parameters for optimizing machine learning models, e.g., neural networks. A method, for example, may determine the threshold-of-truth (alpha), activation function and logical constraints (e.g., convex optimization linear program) of weighted real-valued logic operators such as logical neurons (e.g., weighted offset Łukasiewicz real-valued strong conjunction and/or disjunction operators) to optimize the functional gradients of the activation function for a given maximum expressivity (e.g., defined by the ratio between the maximum and minimum input weights) and operator size or arity (number of operands). In an aspect, various parameters for machine learning determined according to embodiments of the systems, methods and techniques can address a vanishing gradient problem in machine learning, for example, having too small of gradients which renders machine training difficult.

An artificial neural network (ANN) or neural network (NN) is a machine learning model, which can be trained to predict or classify an input data. An artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

An example of a neural network is a recurrent neural network, which can handle time series data or sequence based-data such as sentences in a language. A recurrent neural network model can have a series of neural network cells, which take as input a data in the series and also activation information from the previous neural network in the previous time step.

Fuzzy logic is a logical system in which the Boolean operators of classical logic have been replaced with functions operating on real numbers in the range [0; 1]. Beyond a means of evaluating the truth values of various formulae based on their subformulae, fuzzy logic aims to provide a calculus whereby the truth values of propositions (or predicates) can be inferred from one another in conjunction with a knowledge base (theory) of axioms, themselves assigned fuzzy truth values.

In weighted fuzzy logic, logical formulae and/or their components bear real-valued weights representing importance, influence, or some related concept. Such a system of logic allows more flexible expressions of the relationships between propositions (or predicates if extended to first-order logic). Weighted fuzzy logic is suited for automated learning because it grants a continuous means of adjusting each operand's effect in a given formula.

For example, Łukasiewicz logic is a real-valued logic or many-valued logic in which sentences may be assigned a truth value of not only zero or one but also any real number in between (e.g. 0.3). The propositional connectives of Łukasiewicz logic include implication→, negation ¬, equivalence ↔, weak conjunction ∧, strong conjunction ⊗, weak disjunction ∨, strong disjunction ⊕, and propositional constants 0 and 1.

A neuro-symbolic representation is a weighted, real-valued logic in neural network form that can be constrained to behave equivalently to classical logic (or fuzzy logic). In embodiments, the system and method can determine various parameters for a neuro-symbolic representation, which includes neurons evaluating classical logic functions, for example, similar to activation functions.

For instance, a neural network in an embodiment includes logical neurons. A logical neuron can emulate a logical gate such as AND, OR, IMPLIES, NOT, and/or others. A neural network of logical neurons can be trained to implement a logical rule and perform logical reasoning. Logical neurons are similar to any sigmoidal neuron used in neural networks, but can differ in the following properties. Weights of logical neurons are constrained such that their outputs reflect the behavior of operations occurring in classical logic, e.g., AND, OR, and IMPLIES. Their inputs and outputs are understood to be bounds on truth values. Truth values range from 0 to 1, though may be interpreted classically if they are bounded above some (e.g., defined) threshold or below 1, e.g., above a threshold $\alpha$ or below $1-\alpha$. They can be evaluated as normal or used to perform modus ponens, whereby bounds for each input are computed based on known bounds for the output and the other inputs. Modus ponens refers to the rule of logic stating that if a conditional statement ("if p then q") is accepted, and the antecedent (p) holds, then the consequent (q) may be inferred.

Given the logistic function $S(x)=(1+\exp(-x))^{-1}$ and a chosen threshold of truth $0.5<\alpha<1$, it is useful to define a scaled and offset $\alpha$-preserving sigmoid $$S_\alpha(x) = S\left(\frac{S^{-1}(\alpha)}{\alpha - 0.5}(x - 0.5)\right). \quad (1)$$

As per its definition, this function has the property that $S_\alpha(\alpha)=\alpha$ and $S_\alpha(1-\alpha)=1-\alpha$. For logical neurons indexed $j \in N$, normal computation is then $$a_j = S_\alpha(\Sigma_{i \in I_j} w_{i,j} x_i - \theta_j) \quad (2)$$

for truth value inputs $x_i$, input weights $w_{i,j}$, activation threshold $\theta_j$, and activation output $\alpha_j$. The inputs to logical neurons can be the outputs of other logical neurons or the outputs of specialized neurons pertaining to propositions. As a result of modeling operations in logical formulae, the size of input set $I_j$ can be very small, e.g., just 2 for binary operations, though associative operators can have more inputs. In another aspect, one can consider $I_j$ to be larger but with most weights $w_i$ exactly equal to 0.

An activation function at each neuron may compute an output of that neuron or node, and can be chosen to represent a particular logical operation or a family of operations. Each node in the network may compute as output an upper bound and lower bound values for its truth values. These upper bound and lower bound truth values are continuous variables at each node and passed around the network. These bounded truth value variables are computed at a node at prediction time or inference time, and they are computed based on the inputs and computed with respective to importance weights which have been learned.

Figure 6:
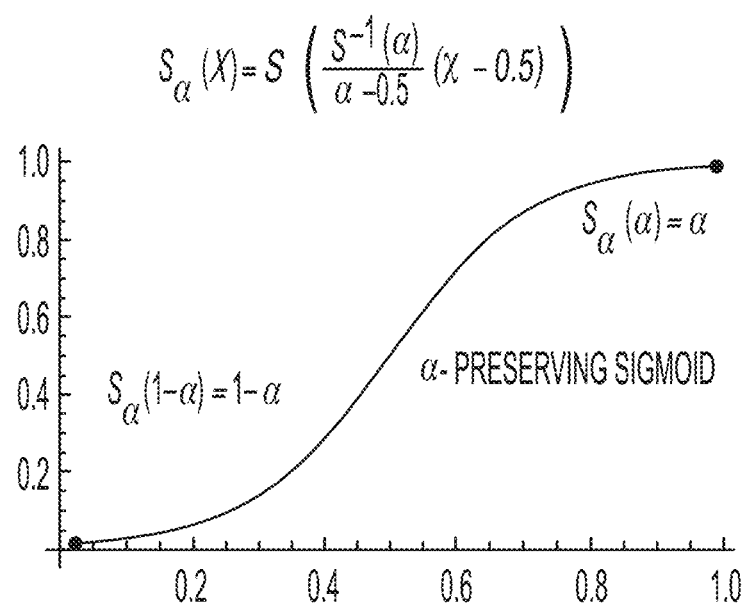
FIG. 6 illustrates an α-preserving sigmoid activation function in an embodiment.

Constraints on logical neurons (e.g., logical constraints) can be derived from the truth tables of the operations they intend to model and from established ranges for "true" and "false" values. In an aspect, a continuous truth values is considered true if its lower bound is at least $\alpha$ and false if its upper bound is at most $1-\alpha$. Using the $\alpha$-preserving sigmoid, it can be enough to constrain the results of its linear argument to lie above or below the appropriate such threshold. FIG. 6 illustrates an $\alpha$-preserving sigmoid activation function in an embodiment.

As an example, the truth table for, e.g., binary AND suggests a set of constraints given:

| p | q | p∧q | |
|---|---|---|---|
| 0 | 0 | 0 | $w_p \cdot (1-\alpha) + w_q \cdot (1-\alpha) - \theta \leq (1-\alpha)$ |
| 0 | 1 | 0 | ------> $w_p \cdot (1-\alpha) + w_q \cdot 1 - \theta \leq (1-\alpha)$ |
| 1 | 0 | 0 | $w_p \cdot 1 + w_q \cdot (1-\alpha) - \theta \leq (1-\alpha)$ |
| 1 | 1 | 1 | $w_p \cdot \alpha + w_q \cdot \alpha - \theta \geq \alpha$ | where $\theta$ is a threshold, w represent weights.

For example, a false logic value (0) is represented as (1−α) and true logic value (1) is represented as α in deriving the constraints.

More generally, n-ary conjunctions (of positive inputs) have constraints of the form $$\forall k \in I, w_k \geq 0$$

$$\alpha \Sigma_{i \in I} w_i - \theta \geq \alpha \quad (3)$$

$$\forall k \in I, \Sigma_{i \in I} w_i - w_k \alpha - \theta \leq 1 - \alpha \quad (4)$$

while n-ary disjunctions have constraints of the form $$\forall k \in I, w_k \geq 0$$

$$\forall k \in I, w_k \alpha - \theta \geq \alpha \quad (5)$$

$$(1-\alpha)\Sigma_{i \in I} w_i - \theta \leq 1 - \alpha \quad (6)$$

For example, (3) requires conjunctions to return true if all of their inputs are true, while (4) requires them to return false if any of their inputs are false, even if their other inputs are all 1, i.e., maximally true the converse if true of disjunctions. Given negation defined ¬p=1−p, the classical identity p→q=¬p∨q permits implications to use the same constraints as disjunctions. The above two sets of constraints are equivalent under the DeMorgan laws, e.g., p∨q=¬(¬p∧¬q).

As a result of these constraints, normal evaluation of logical neurons is guaranteed to yield results within the established ranges for true and false if all of their inputs are within these ranges as well.

For activation linear inputs of the form $t-\Sigma_{i \in I} w_i(1-x_i)$ for conjunctions and $1-t+\Sigma_{i \in I} w_i x_i$ for disjunctions, constraints are equivalent to the above with $\theta = \Sigma_{i \in I} w_i - t$ and $\theta = t - 1$, respectively. This then suggests constraints of the form $$t - (1-\alpha)\sum_{i \in I} w_i \geq \alpha$$

$$\forall k \in I, t - w_k \alpha \leq 1 - \alpha$$

and $$\forall k \in I, 1 - t + w_k \alpha \geq \alpha$$

$$1 - t + (1-\alpha)\sum_{i \in I} w_i \leq 1 - \alpha.$$

In an aspect, reasoning in terms of bounds on truth values mitigates a number of challenges inherent in implementing logical inference in a neural network. Bounds offer an elegant and intuitive mechanism to express the four states a truth value can occupy during inference: unknown, known true, known false, and known contradiction. Bounds provide a mechanism whereby modus ponens can return a nonresult. Reasoning in terms of bounds facilitates the ability to aggregate multiple proofs for the same proposition.

It can be desirable for an input's weight to be able to drop to exactly 0, thereby effectively removing it from I. To permit this, a slack variable (s) can be introduce for each weight, allowing its respective constraints in (4) or (5) to be violated as the weight drops to 0:

$$\forall k \in I, s_k \geq 0$$

$$\forall k \in I, \Sigma_{i \in I} w_i - w_k \alpha - s_k - \theta \leq 1 - \alpha \quad (4^*)$$

$$\forall k \in I, w_k \alpha + s_k - \theta \geq \alpha \quad (5^*)$$

These remain consistent with the original constraints if either $s_k=0$ or $w_k=0$. An optimization can include choosing such parameterizations by updating the training loss function to include a penalty term scaling with $s_k w_k$. The coefficient on this penalty term controls how classical learned operations are, with exact classical behavior restored if optimization reduces the penalty term to 0.

FIG. 1 illustrates a neuron or logical neuron in a network of logical neurons in an embodiment. The weighted inputs to the neuron are combined through a weighted sum or linear combination inside the neuron 102, before inputting the result into the activation function 104 of the neuron. In the example shown, a logical neuron 102 corresponding to a logical conjunction (AND) operation on a vector x of logical truth-values in range [0, 1] can be defined in the form of Łukasiewicz fuzzy t-norm (triangle-norm) as the argument to the neuron activation function $f$ as follows:

$$f(t-\Sigma w(1-x))$$

The logical neuron receives one or more input operands $x_0, x_1, \ldots, x_i, \ldots, x_n$ with each operand having a respective assigned or computed weight $w_0, w_1, \ldots, w_i, \ldots, w_n$ representing an importance. The input values are combined according to the defined formulation, $t-\Sigma w(1-x)$, and input to the neuron activation function $f$. "t" represents the maximum input expected for the neuron activation, which corresponds to where the output of the logical conjunction is fully true.

By way of example, a conjunction (&, also AND) neuron can be defined as:

$$\&(x)=f(t-w\cdot(1-x)).$$

Constraints or logical constraints to the conjunction neuron can be defined as follows:

$$\forall i: t-(w_i\alpha+s_i)\leq 1-\alpha$$

$$t-\Sigma w(1-\alpha)\geq \alpha$$

Where, $\forall i: w_i \geq 0, s_i \geq 0$

In an embodiment, the system determines parameter values, including threshold of truth and activation threshold, for the parameterized activation $f$ that maximizes the product of the expressivity and gradient quality for the expected input distribution to the activation function as calculated in the argument to the activation function in the logical neuron. In an embodiment, in constrained neurons: 1. $f$ is odd, monotonically increasing, range [0,1], and alpha (α) preserving; 2. Define degree of truth for thresholding: e.g., 0.5<α≤1; 3. Slacks $s_i$ allow for input removal; 4. For example, one false input to a logical conjunction (AND) neuron should make its output false.

Figure 2A:
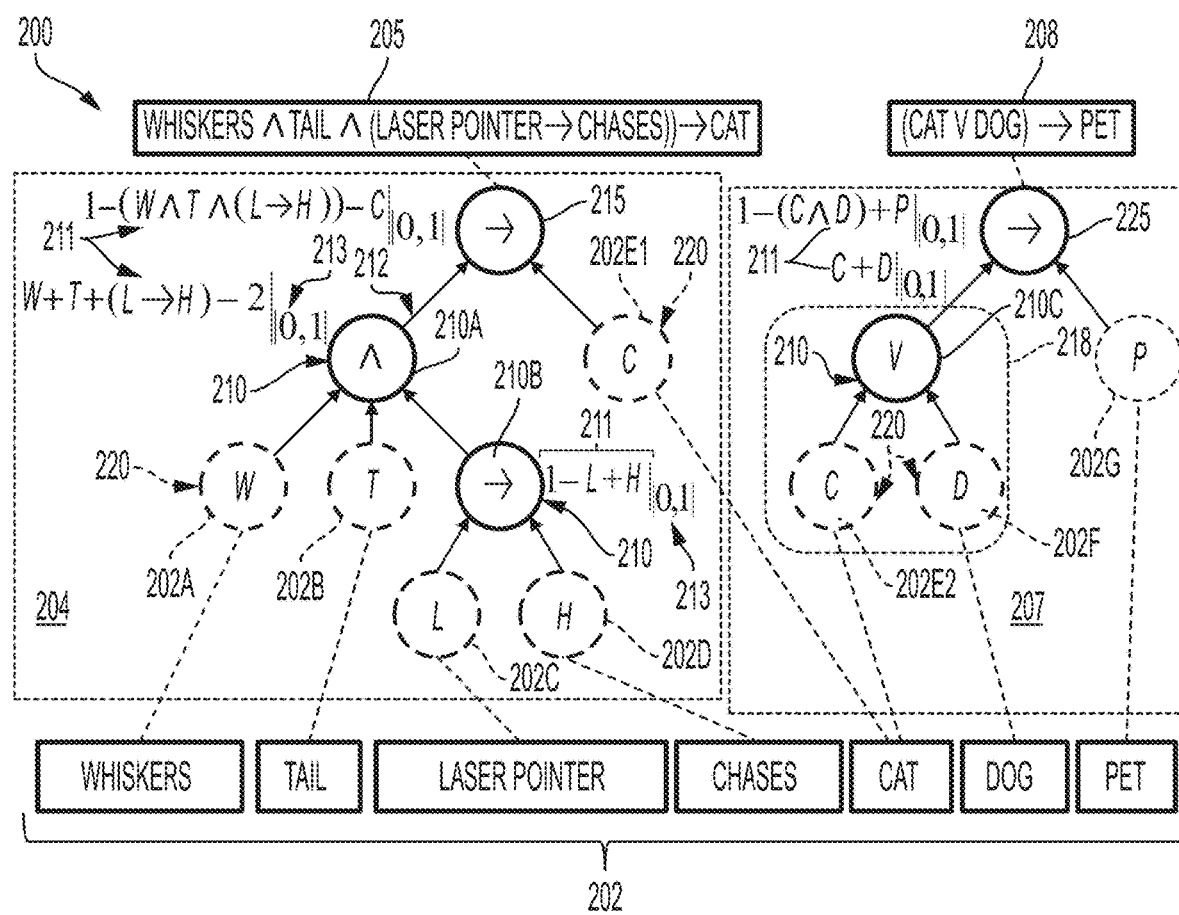
FIGS. 2A and 2B show an example of a network of logical neurons in an embodiment.
Figure 2B:
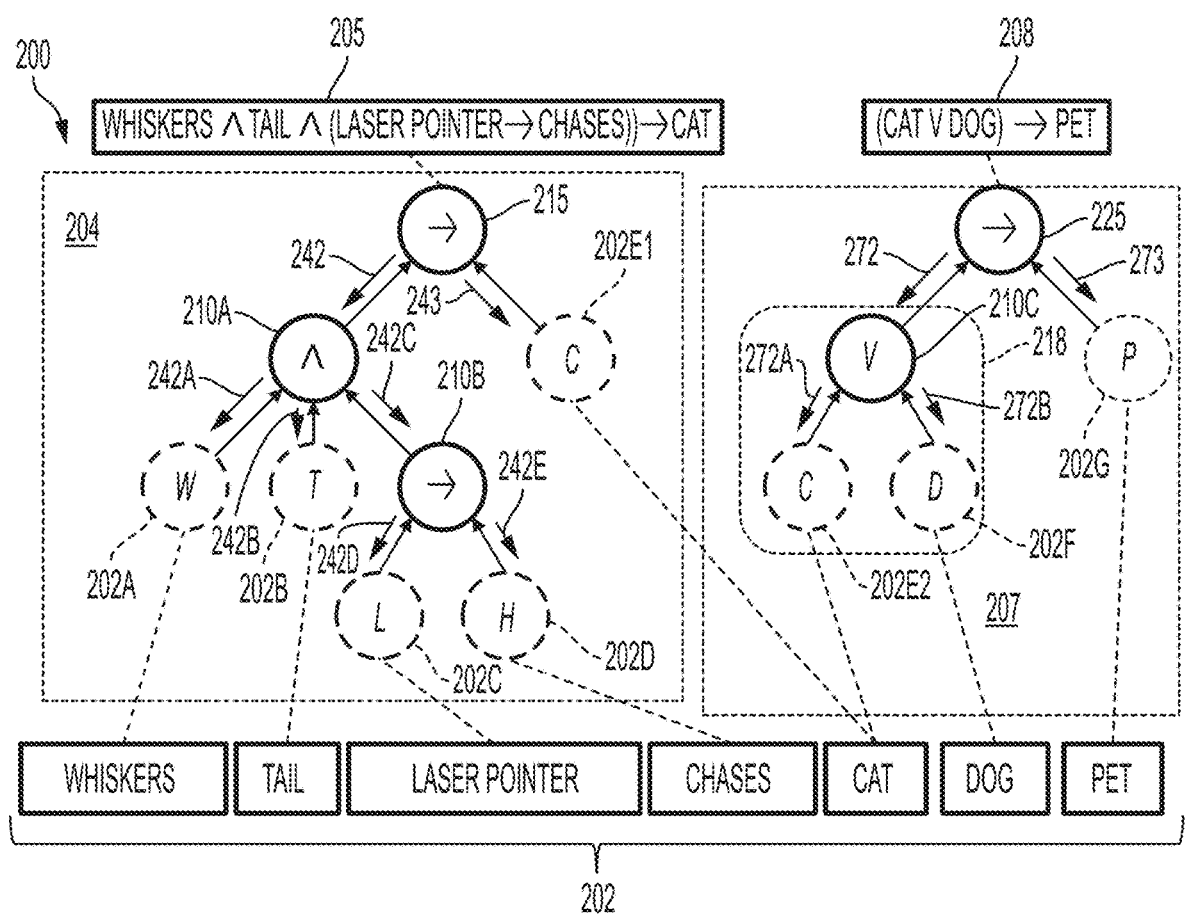

A neuro-symbolic representation can have a neural network formed of a plurality of logical neurons forming a logical formula. FIGS. 2A and 2B show an example of a network of logical neurons in an embodiment. An example of a logical inference can be "Whiskers∧Tail∧(Laser pointer→Chases)), →Cat" (Whisker AND Tail AND (Laser pointer IMPLIES Chases) IMPLIES Cat). Another example of a logical inference can be "(Cat V Dog)→Pet" (Cat OR Dog) IMPLIES Pet. Known truth values for any proposition or formula may be used as ground truth in neural net optimization.

FIG. 2A depicts a logical network tree structure depicting a use-case example of a neural network with logical neurons in an embodiment. FIG. 2B shows backward inference computations in the logical network tree structure of the use-case example of a neural network of FIG. 2A.

FIG. 2A shows an example use-case of a neural network ("net" or "NN") 200, which include logical neurons, formed in accordance with the methods herein in an embodiment. While in general the neural network is described in terms of first-order logic, the following use-case example first describes the neural network restricted to the scope of propositional logic.

As shown in FIG. 2A, there is one neuron 210 per logical connective or edge 212 plus one neuron 220 per proposition/ predicate 202. Each generated neuron 210 has a 1-to-1 correspondence with a system of logical formulae 205, 208 in which evaluation is equivalent to a logical inference. For generating logical neural networks, a computing system receives inputs, e.g., knowledge graph/prediction input data/ facts for use in outputting a truth value (represented by upper and lower bounds) at any neuron, e.g., usually one pertaining to a query formula. The neurons 210 are arranged to match formula syntax trees and proposition/predicate neurons 220 both provide and recurrently aggregate proved truth values. In general, negation (and first-order quantifiers) are pass-through nodes with no parameters. As shown certain neurons 210 give uncertainty bounds 213 of a value between 0 and 1. Each neuron 210 has a tailored activation function 211 whose computation results in the bounds on truth values. Further methods of bidirectional inference are employed.

As shown in FIG. 2A, the example use-case logical network (net) 200 includes a syntax tree graph structure 204 constructed to correspond to the logic formula 205 at the time of NN model creation and shown in symbolic logic reasoning. A logical network has logical connectives and predicates as nodes and edges as part of the syntax tree of the corresponding system of logical formulae. A second syntax tree structure 207 is shown in FIG. 2A that is constructed to correspond to the input logic formula 208 also at model creation time. Input logic formulae 205, 208 are rules about the world and can be authored by experts, or generated in a haphazard way, e.g., extracted by an integer linear programming (ILP) or natural language programming (NLP) device. Formulae 205, 208 can be known formulae or portions thereof, i.e., sub-formulae, and can be subject to modification or be tweaked at model creation time and/or during prediction or inference time. That is, certain inputs to formulae or inputs (e.g., operands) to sub-formula can be weighted based on their importance, and consequently can be assigned with importance weights that become part of the structure of the NN. Thus, each operand of each connective in the formula is or can be assigned importance weights, and allows for modifications of each formula or weight unless they are optimized.

For the use-case example, for sub-graph 218 "cat" node can be weighted twice as important as "dog" and thus is a modified version of the disjunction "OR" connective that skews results in the sense that "cat" now has more influence than "dog" does in the formula.

Each of the syntax tree graphs 204, 207 for respective formula are constructed based on an initial list of input propositions 202 having a defined truth value (e.g., true or false) including: "whiskers" 202A, "tail" 202B, "laser pointer" 202C, "chases" 202D, "cat" 202E1, 202E2, "dog" 202F, and "pet" 202D existing in the formulae. Alternately, these inputs could be predicates, e.g., statements whose truth value depends upon more than one variable(s). The logical formulae 205, 208 are applied that result in an evaluation of a respective inference or implication (e.g., "Whiskers∧Tail∧(Laser pointer→Chases)), →Cat") and evaluation of an inference or implication (e.g., "Cat∨Dog)→Pet"). In FIG. 2A, a sub-formula is shown as corresponding sub-graph 218 (e.g., "Cat∨Dog"). Though inference rules are not depicted, there is depicted the activation functions 211 that exist at particular nodes 210 based on a particular chosen logic, e.g., Łukasiewicz logic. The activation functions 211 are shown corresponding to particular logical connectives, e.g., nodes 210A, 210B, 210C that exist in the formulae 205, 208. Example classical propositional logical connectives employ Boolean operations, e.g., include AND, OR, implication, a negation and logical equivalence and employ truth values as ones or zeros.

An example recurrent (bi-directional) backward inference (backwards passes) is shown in FIG. 2B corresponding to the example NN 200 shown in FIG. 2A. While the system has not converged, a backwards traversal of the logical network occurs to update the truth values of the various propositions. In the NN, every path from root node 215 to every leaf is traversed to evaluate inverse inference rules at each node in the downward direction. In an embodiment without any guidance, a depth-first traversal is performed with a sweep of root to leaf paths in syntax trees for each formula. For example, a first path evaluated being a modus tollens edge 242 that attempts to refute the conjunction based on knowledge of "cat" and then a conjunctive syllogism edge 242A attempting to disprove "whiskers" if the conjunction was false. Then a next conjunction syllogism evaluation can be performed at edge 242B, and then at edge 242C for the sub-expression "laser point implies chases" at node 210B, etc.

In embodiments, information is back-propagated along the following backwards paths to update inverse function computations in tree 204: i.e., the path as shown by arrows 242, 242A where the truth value (i.e., upper bounds and lower bounds) of the whiskers predicate 202A is updated by the inverse activation function computation at the conjunction neuron 210A; the path as shown by arrows 242, 242B where the truth value (upper bounds and lower bounds) of the tail predicate 202B is updated by the inverse activation function computation at the conjunction neuron 210A; the path as shown by arrows 242, 242C, 242D where the truth value (upper bounds and lower bounds) of the laser pointer predicate 202C is updated by the inverse activation function computations at the conjunction neuron 210A and implication neuron 210B; the path as shown by arrows 242, 242C, 242E where the truth value (upper bounds and lower bounds) of the chases predicate 202D is updated by inverse activation function computation at the conjunction neuron 210A and at the implication neuron 210B; and the path as shown by arrow 243 where the truth value (upper bounds and lower bounds) for the cat predicate 202E1 is updated by inverse activation function computation at the implication neuron 215. Similarly, the following backwards paths are traversed to perform inverse function computations in syntax tree 207: i.e., the path as shown by arrows 272, 272A where the truth value (upper bounds and lower bounds) for the cat predicate 202E2 is updated by the inverse activation function computation at the disjunction neuron 210C; the path as shown by arrows 272, 272B where the truth value (upper bounds and lower bounds) of the dog predicate 202F is updated by the inverse activation function computation at the disjunction neuron 210C; and the path as shown by arrow 273 where the truth value (upper bounds and lower bounds) for the pet predicate 202G is updated by inverse activation function computation at the implication neuron 225.

In one aspect, fuzzy logic is employed that provides probabilities of truth values that range between zero and one, i.e., values in between 0 and 1 are ambiguous mixtures between true and false. In an embodiment, alpha $\alpha$ is defined as a threshold of truth ranging between, e.g., $0.5 < \alpha \leq 1$. Thus, any evaluated truth value is constrained such that values above $\alpha$ are considered "true" and any truth value less than a quantity $1-\alpha$ is considered "false".

An activation function 211 is the particular function at each neuron 210 to compute an output of that neuron, and is chosen to represent a particular logical operation or a family of activation functions are chosen that represent logical operations that are consistent with a particular logic scheme, e.g., Łukasiewicz logic. For example, as shown in sub-formula 218 the activation function is a disjunction function that is evaluated as the addition (sum) of the inputs. In the "unweighted" case example depicted in FIG. 2A, the disjunction activation function at node 210C provides an output that is clamped to be a value 0 or 1.

In an embodiment, for real-valued logical connectives, example activation functions compute truth value according to constraints as follows:

For a Conjunction (AND):

$$p \otimes q = \max(0, p+q-1)$$

where p and q are operands, the constraint is the sum of the two operand value inputs minus 1 clamped below by 0.

For Disjunction (OR):

$$p \oplus q = 1 - ((1-p) \otimes (1-q)) = \min(1, p+q)$$

i.e., the sum of the two operand input values clamped above by 1.

For Implication ($\rightarrow$)

$$p \rightarrow q = (1-p) \otimes q = \min(1, 1-p+q)$$

i.e., is similar to disjunction however, one of the inputs is negated $(1-p)$. As an example, as shown at node 210A, the activation function is a conjunction function. In the "unweighted" case example depicted in FIG. 2A, the conjunction function activation function according to Łukasiewicz logic is evaluated as the addition (sum) of the inputs minus the number of elements plus One (1).

Other activation functions according to other logic schemes can be employed in embodiments. Moreover, different logistic functions can be used as activation functions in different parts of the NN. For example, a "weighted" Łukasiewicz logic scheme for logical connectives is employed, where activation functions compute truth values as follows: For the activation function of neurons corresponding to AND, a weighted Lukasiewicz t-norm is defined as:

$$p^{(w_p)} \otimes^\beta q^{(w_q)} = \max(0, \min(1, \beta - w_p(1-p) - w_q(1-q)))$$

Then, for disjunction case (OR) the following associated weighted t-conorm can be used:

$$p^{(w_p)} \oplus^\beta q^{(w_q)} = 1 - ((1-p)^{(w_p)} \otimes^\beta (1-q)^{(w_q)}) = \max(0, \min(1, 1-\beta + w_p p + w_q q))$$

For an Implication ($\rightarrow$):

$$p^{(w_p)} \rightarrow^\beta q^{(w_q)} = (1-p)^{(w_p)} \oplus^\beta q^{(w_q)} = \max(0, \min(1, 1-\beta + w_p(1-p) + w_q q))$$

In each of the above constraints, $\beta$ is a bias term establishing an operation, weights w express importance, with $w_p$ a weight for input operand p and $w_q$ a weight of input operand q. Bias term $\beta$ can be a value of 1, although it could be another value. Inside the clamps is an expression or formula of a hyperplane, i.e., a dot product between the weights (inputs) vector plus an offset.

Systems and methods in embodiments may determine various parameters used in training such above described neural network. A method, for example, in an embodiment may implement and learn logic with special artificial neurons, for instance, which can address the problem of uncovering logic from observations, correcting logical programs, and integrating logical reasoning into neural networks and differentiable learning systems. The method may approximate neuron activation function to provide non-zero gradients. The method may also quantify the relative gradient magnitude. The method may also define the neuron input weights expressivity. The method may also optimize the tradeoff between gradient quality and expressivity. The method may also define an optimal activation function and set of logical constraints for the logical neurons.

Gradient quality relates to availability of non-zero and/or relatively non-small gradients in the operating range of the neuron's activation function, where high gradient quality ensures that there is non-zero and relatively non-small change in truth-value outputs for a change in the neuron parameters. Gradient quality relates to ensuring the ability to calculate error gradients under all conditions, for example, so that learning can happen through gradient descent. In an embodiment, gradient quality is a relative scalar measure and can be expressed in terms of a ratio-averaged flanks gradient, an average gradient involving flank gradients that are ratio-averaged. In optimizing an activation function (the neuron's activation function), the gradient quality measure can be used relatively, e.g., choosing an optimization direction where the gradient quality at a new optimum is higher than at a previous optimum. An activation function with a higher ratio-averaged flanks gradient is considered to have higher quality, than one with a less ratio-averaged flanks gradient. Expressivity refers to the ratio of the smallest to largest input weight of a neuron, and relates to the distribution width of input weights to logical neurons.

Figure 5:
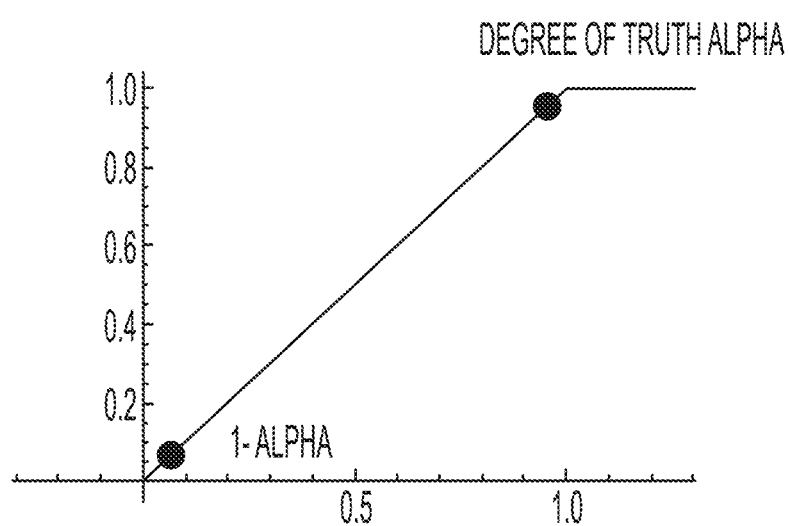
FIG. 5 is a diagram which shows an example threshold-of-truth in an embodiment.

Threshold-of-truth refers to the limit over which real-valued truth values are considered to be true, and can be used for external interpretation in terms of classical true/false truth values. In an embodiment, the threshold-of-truth can be a learnable parameter of the activation function. Notation for representing threshold-of truth can be "$\alpha$". A continuous truth value is considered true if its lower bound is at least $\alpha$ and false if its upper bound is at most $1-\alpha$. FIG. 5 illustrates an example of the threshold-of-truth (or degree of truth) in an embodiment. In an embodiment, an optimization process determines the threshold-of-truth value for machine learning in a neural network of logical neurons. In an embodiment, constraints on logical neurons can be derived from the truth tables of the operations they intend to model and from established ranges for "true" and "false" values. A continuous truth value is considered true if its lower bound is at least $\alpha$ and false if its upper bound is at most $1-\alpha$.

In an operator with a user-specified arity and user-specified maximum expressivity, a method in an embodiment calculates alpha ($\alpha$) that maximizes the product of expressivity and gradient quality at the user-specified maximum expressivity. In an aspect, alpha is the threshold-of-truth that can be used for external interpretation of truth values in a classical true/false sense, and by setting it to less than 1, it allows for non-zero gradients. For instance, non-zero gradients facilitate machine training, for example, in back-propagation and can lessen or alleviate the problem of vanishing gradients.

The following notations are also used in the description herein.

Arity refers to the number of input connections to the neuron, where a weight parameter is associated and multiplied with every input.

Maximum expressivity refers to the largest difference in input importance that can be expressed via the weighting of the neuron inputs (inputs to a neuron), and provides a guarantee for the input weight differences that can be supported by the logical neuron.

"t_max" refers to the upper bound of the maximum input expected for the neuron activation, which corresponds with the upper bound of the threshold in the logical neuron formulation. It is the maximum that the threshold of the logical neuron formulation can be set under the given constraints.

"t" refers to the maximum input expected for the neuron activation, which corresponds to where the output of the logical conjunction is fully true.

"t-sum(w)" (t minus summation of w's of a neuron, where w represents a weight associated with an input) refers to the minimum expected input to the logical neuron's activation function, corresponding to a logical conjunction with an output of fully false.

The method herein in one embodiment calculates t_max that is the upper bound of the neuron threshold, and sets the upper bound of t that is the neuron threshold in the constrained linear program (that calculates updated neuron parameters) to t_max indefinitely. T_max can be calculated based on logical constraints derived from a truth table of an operator (e.g., AND operator). When the system has a threshold of truth setting alpha<1 (which can be normally the case, as this provides non-zero gradients in the entire operating range of the neuron) this will also constrain the size and sum of the neuron input weights through the given constraint of t-sum(w)(1−alpha)>=alpha. This minimizes the allowable neuron input weight parameter region while providing for a desired level of expressivity or variation in the neuron input weights, and a minimal convex region can help reduce large abrupt parameter steps during the optimization phase.

In an embodiment, arity, maximum expressivity, alpha, t_max are determined during the initialization phase of the logical neuron and kept fixed afterward during all future neuron weight parameter updates (e.g., during training). In an embodiment, the learning method may also look at changing the threshold of truth alpha associated with the logical neuron, based on the current weight expressivity that supports up to a specific weight difference ratio between weights, to optimize the gradient quality at the current expressivity. This changing of alpha can be performed when current expressivity has changed, that is when the neuron input weight ratio's have changed e.g., the ratio of the maximum to the minimum weights.

In an embodiment, every operator can keep its own 3-piece leaky rectified linear unit (ReLU) activation function, which is updated to saturate at t and t-sum(w) after every parameter update. According to the defined activation function objective, a 3-piece leaky ReLU can be optimal. Briefly, ReLU is a type of activation function, which can be used in neural networks. In leaky ReLU, when x<0, a leaky ReLU can have a small negative slope (e.g., 0.01, or so) instead of the function being zero.

Observations can be made based on the relationship between, arity, expressivity and alpha. For example, an increase in arity may decrease gradient quality. Based on this observation, in an embodiment, a method herein may set a maximum allowable arity and leverage composition and associativity to build larger arity gates from small arity gates.

In an embodiment, an optimum for alpha is determined to maximize the tradeoff between expressivity and quality of learning (gradients). In addition to expressivity, which describes the ratio between the maximum and minimum weights, slack variables can be introduced. The slacks can still allow for inputs to be removed entirely (e.g., by setting or having the weight (w) to zero (e.g., w=0)) without requiring higher expressivity. For example, a constraint slack variable can be introduced for each weight during the learning phase so that the constrained linear program is allowed (through the slack variables) to set weight values that would otherwise have been infeasible as it would have violated the logical constraint. The effective arity may be recalculated, together with alpha and t_max, when inputs are dropped.

A method herein determines the threshold-of-truth (alpha), activation function and logical constraints (e.g., convex optimization linear program) of weighted real-valued logic operators such as logical neurons (e.g., weighted offset Łukasiewicz real-valued strong conjunction or disjunction operators) to optimize the functional gradients of the activation function for a given maximum expressivity (e.g., defined by the ratio between the maximum and minimum input weights) and operator size or arity. Real-valued logic refers to a many-valued logic in which truth values comprise a continuous range.

The method in an embodiment can introduce a relaxation to the logical constraints to enable improved expressivity and machine learning by defining a threshold-of-truth (alpha) that is the uncertainty above which truth-values behave like classical logic true values, and a threshold-of-falsity (1−alpha) below which values behave classically false.

The method in an embodiment can calculate a measure of gradient quality for the activation function of a logical neuron by obtaining the ratio-average gradients only for the parts of its operating region respectively above and below the threshold-of-truth and threshold-of-falsity, given the threshold-of-truth. In an embodiment, gradient quality is a relative scalar measure, which can be measured in terms of the ratio-averaged flanks gradient.

The method in an embodiment can incorporate the expressivity or capacity of the logical operator into its logical constraints to establish a relationship between expressivity and the threshold-of-truth, by modeling the weight distribution such that the sum of weights can be determined given only the minimum weight and expressivity.

Figure 7:
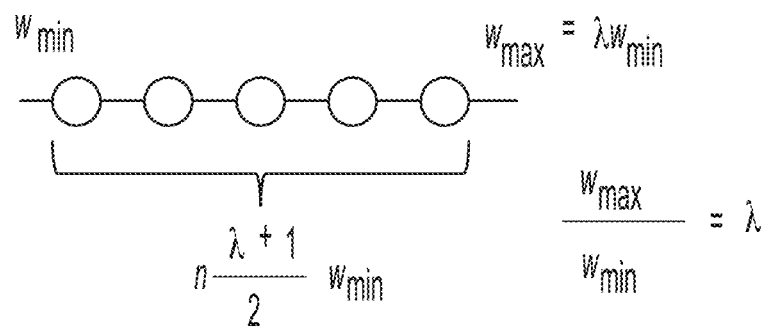
FIG. 7 shows weight distribution in one embodiment.

FIG. 7 shows weight distribution in one embodiment. In an embodiment, expressivity is determined as a ratio of a maximum input weight to a minimum input weight to a logical neuron. For example, expressivity $\lambda=W_{max}/W_{min}$. For example, $W_{max}=\lambda W_{min}$. The sum of the weights can be expressed as $$n\frac{\lambda+1}{2}W_{min},$$

where n represents the number of input weights or arity.

In an embodiment, in addition to symmetric weight distributions like uniform and normal, the method can also admit asymmetric weight distributions and determine the relationship between the allowable expressivity and threshold-of-truth. An embodiment may model input weights according to a Poisson distribution (also inversely) describing the amount of events per interval. For example, in an example use case involving electronic mail (emails), an embodiment of a method can model input weights according to a Poisson distribution (also inversely) describing the amount of events per interval, e.g., according to the number of emails received or responses made per day for a given input email (or email inbox) in a logical filter that filters unwanted or inappropriate email. When a logical filter of an email provider analyzes incoming email activity/counts for each of the email users/inboxes, then a logic rule takes the receipt of a suspected email (Boolean condition) at each of these inboxes as input to determine a real-valued logic output that is true when the suspected email is deemed to be an unwanted email or false otherwise. A logical filter can provide a classification or labeling of emails based on internal logical processing. For example, an email provider hosts email storage, sending, receipt and access services for its registered users. A logical filter is automatically applied to all incoming emails to a user's inbox in order to provide a label or classification, such as whether an email comes from a reputable source. A logical filter can have internal processing based on one or more logical rules that take as input truth values associated with, e.g., external conditions about an email or user, such as whether an email sender address domain is the same as the sending email server domain. The disclosed method can produce a real-unit interval [0, 1] truth-value from the logical filter, such as to indicate how suspected an email is, based on the input propositions and features of the email. The input weight to the logical operator taking propositions of whether an input email has received suspected email can thus incorporate relevant information that can increase or decrease the influence of the input. For example, if the network of neurons with logical operator activations receives many incoming emails, then suspected email is expected, and that input is down-weighted, i.e., the weight for that input (or neuron) is decreased. For example, if the logical filter observes that many inboxes that do not typically receive suspected emails do all receive the same email, then this is a stronger indication that this email is suspect. Whereas, if an inbox that typically receives many emails also receives the suspected email, then it could weigh less as a vote for suspecting the email, than from another inbox that receives far fewer emails.

In an embodiment, a lower bound on the minimum weight is determined in terms of expressivity, operator arity and threshold-of-truth. Where only uniform expressivity is desired, the calculation can be simplified by system-wide setting of expressivity to 1.

The method in an embodiment can construct and continually update an activation function for a given threshold-of-truth to optimize the gradients of the activation function over the logical operating range, e.g., by forming a piecewise linear function that is false at the operating range minimum, at threshold-of-falsity for a threshold-of-falsity input, at threshold-of-truth for a threshold-of-truth input, and true at the operating range maximum. In an embodiment, operating range of false is [0, 1-alpha]. In an embodiment, operating range of true is [alpha, 1].

The method in an embodiment can set the threshold-of-truth to the same value indefinitely that maximizes the product of expressivity and the gradient quality at maximum expressivity. The threshold-of-truth value can be updated based on the current expressivity. For example, expressivity can change as weights are learned and changed. Based on a changed expressivity, the threshold-of-truth value can be recomputed or updated.

Figure 9:
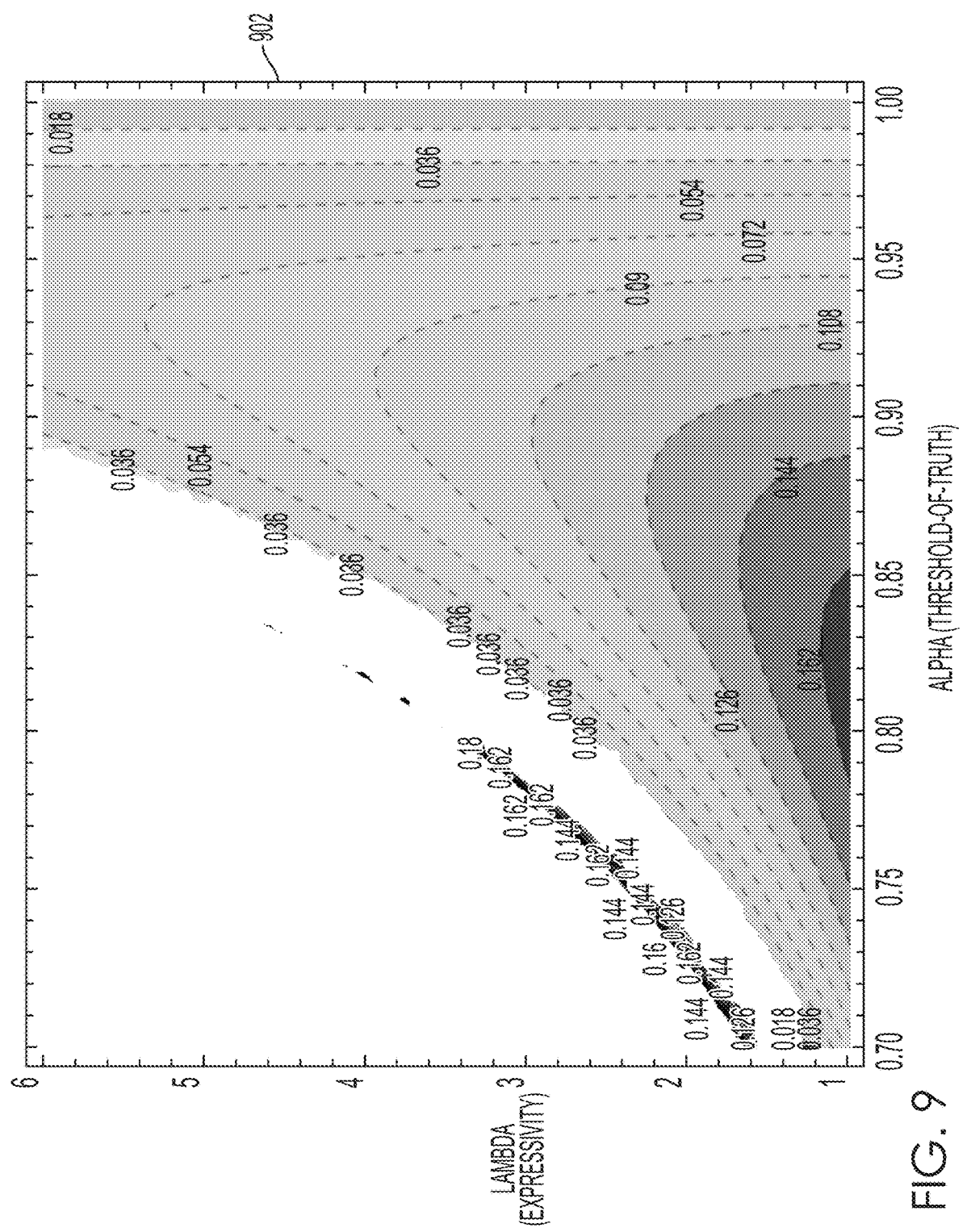
FIG. 9 illustrates example user interface visualization in an embodiment.

In an embodiment, method can include determining and updating the threshold-of-truth. The method may also include providing a user interface that calculates, updates and visualizes various aspects and properties of real-valued logic operators based on a set of user value selections. Relevant values of expressivity and arity can be decided based on the various aspects and properties of real-valued logic. For example, the method may visualize the logical decision surface and operating region and analyze the effect of expressivity and arity on it, and also determine viable parameter regions ensuring lower bounds on expressivity. FIG. 9 illustrates an example of user interface visualization in an embodiment. The visualization provides an activation objective plot 902. Such activation object plot 902 allows a user to decide which x- or y-value the user would want to set the maximum expressivity or alpha values. For instance, y-axis represents expressivity setting and x-axis represents alpha value setting in the plot or graph. Various points in the plot show activations for different values of maximum expressivity and alpha value. Such visualization can be shown for different activation functions such as, but not limited to, a sigmoid function and a ReLU function (e.g., 3-piece leaky ReLU). Different plots of maximum expressivity versus alpha can be shown for different values of arity (number of operators or inputs).

The method in an embodiment can introduce slacks in the logical constraints to allow for inputs to receive zero weight without requiring a corresponding change in the defined expressivity value to allow inputs to be removed completely.

The method in an embodiment can set the maximum logical offset (e.g., for weighted offset Łukasiewicz real-valued strong conjunction or disjunction operators) and the corresponding offset upper bound in the logical constraints to the same value indefinitely given the specified formula taking threshold-of-truth, arity and expressivity as inputs.

In an embodiment, the method specifies the threshold-of-truth as the learnable parameter of the activation function. In an embodiment, an activation function optimization specifies particulars to ensure logical functionality.

Explicitly reasoning in terms of bounds on truth values mitigates a number of challenges inherent in implementing logical inference in a neural network. Bounds offer an elegant and intuitive mechanism to express the four states a truth value can occupy during inference: unknown, known true, known false, and known contradiction. Bounds provide a mechanism whereby modus ponens can return a nonresult. Reasoning in terms of bounds facilitates the ability to aggregate multiple proofs for the same proposition.

The following illustrates determining the threshold-of-truth (alpha), activation function and logical constraints (e.g. convex optimization linear program) of weighted real-valued logic operator or logical neuron, which implements an AND operation or gate. The systems and methods can also apply to other logic gates or operations.

In an embodiment, a logical neuron corresponding to a logical conjunction or AND operation on a vector x of logical truth-values in range [0, 1] can be defined in the form of Łukasiewicz fuzzy t-norm (triangle-norm) being the argument to the neuron activation function $f$ as follows:

$$f(t-\Sigma w(1-x))$$

The following illustrates defining expressivity and threshold-of-truth a in an embodiment. The following notations are used in the formulations.

t represents the neuron threshold or bias, which corresponds to the maximum input to the neuron activation function.

w represents a vector of learnable weight parameters associated with each of the inputs to the logical neuron.

α represents the threshold of truth for the neuron, above which truth-values (between the range of 0 and 1) may be interpreted as classically true.

n represents the arity or number of inputs to the logical neuron.

λ represents the expressivity or the ratio of the maximum input weight to the minimum input weight.

t_min represents a lower bound on the neuron threshold, which corresponds to the least the neuron threshold can be set to while still satisfying the neuron logical constraints.

w_min represents the minimum input weight among the set of input weights to the logical neuron.

s represents a vector of slack variables, one associated with each of the input weight parameters to the logical neuron. These slack variables are used to determine constraint satisfaction and to calculate loss terms, but are not otherwise used in, e.g., the inference phase of the logical neuron.

s_i represents a specific slack variable associated with neuron input indexed by integer i.

x_min represents the minimum point in the operating range of the logical neuron, which corresponds to the minimum input expected to the activation function of the logical neuron.

t_max represents the upper bound on the neuron threshold, which corresponds to the greatest the neuron threshold can be set to while satisfying the neuron logical constraints.

In an embodiment, the following defines lower bound on t.

$$t - \sum w(1-\alpha) \geq \alpha$$

$$t \geq \alpha + n(1-\alpha)\frac{\lambda+1}{2}w_{min}$$

$$t_{min} = \alpha + n(1-\alpha)\frac{\lambda+1}{2}w_{min}$$

In an embodiment, the following defines upper bound on t.

$$t - (w_i \alpha + s_i) \leq 1 - \alpha$$

$$t \leq 1 - \alpha + \alpha w_{min}$$

$$t_{max} = 1 - \alpha + \alpha w_{min}$$

In an embodiment, the upper bound on t, $t_{max}$, is calculated by choosing a constraint for i where $w_i$ is chosen such that t is the maximum possible value, namely $w_i = w_{min}$. The alpha value used here can be the same alpha value used in the other constraints and calculation of all derived values depending on alpha. In an embodiment, there may be one alpha value for a given logical neuron. There may be different alpha values for other logical neurons.

In an embodiment, the following defines lower bounds on x, which is the least input expected to the activation function of the logical neuron and the minimum point of the operating range of the neuron.

$$x_{min} = t_{min} - \sum w$$

$$x_{min} = t_{min} - n\frac{\lambda+1}{2}w_{min}$$

$$x_{min} = \alpha + n(1-\alpha)\frac{\lambda+1}{2}w_{min} - n\frac{\lambda+1}{2}w_{min}$$

$$x_{min} = \alpha - \alpha n\frac{\lambda+1}{2}w_{min}$$

In an embodiment, the following defines lower bound on $w_{min}$.

$$t_{min} \leq t_{max}$$

$$\alpha + n(1-\alpha)\frac{\lambda+1}{2}w_{min} \leq 1 - \alpha + \alpha w_{min}$$

$$\left(n(1-\alpha)\frac{\lambda+1}{2} - \alpha\right)w_{min} \leq 1 - \alpha + \alpha w_{min}$$

$$w_{min} > \frac{1-2\alpha}{n(1-\alpha)\frac{\lambda+1}{2} - \alpha}$$

In an embodiment, the following defines logical bandwidth, which is the width of the operating range of the activation function of the logical neuron. A larger logical bandwidth necessarily means a smaller gradient quality, while a lesser logical bandwidth means a smaller expressivity. The logical bandwidth is thus a measure that is used to balance gradient quality and expressivity in the system optimization.

$$t_{max} - x_{min} = 1 - \alpha + \alpha w_{min} - \left(\alpha - \alpha n\frac{\lambda+1}{2}w_{min}\right)$$

$$t_{max} - x_{min} = 1 - 2\alpha + \alpha w_{min} + \alpha n\frac{\lambda+1}{2}w_{min}$$

$$t_{max} - x_{min} = 1 - 2\alpha + \left(\alpha + \alpha n\frac{\lambda+1}{2}\right)\alpha w_{min}$$

$$t_{max} - x_{min} = 1 - 2\alpha + \left(\alpha + \alpha n\frac{\lambda+1}{2}\right)\frac{1-2\alpha}{n(1-\alpha)\frac{\lambda+1}{2} - \alpha}$$

In an embodiment, the following defines upper bound on λ (expressivity).

$$n(1-\alpha)\frac{\lambda+1}{2} - \alpha < 0$$

$$\lambda < \frac{2\alpha}{n(1-\alpha)} - 1$$

$$\frac{n(\lambda+1)}{(2 + n(\lambda+1))} < \alpha$$

The above defined lower bound on t, upper bound on t, lower bounds on x, lower bound on $w_{min}$, logical bandwidth, and upper bound on λ, are used in formulating the activation optimization function.

The following illustrates activation optimization in an embodiment. The optimization maximizes ratio-average flanks gradient (expressed as g) and expressivity (expressed as λ) (activation optimization).

$$\max_f g\left(\lambda, \frac{\int_{x_{min}}^{1-\alpha}\left(\frac{d}{dx}f(x)\right)dx}{1-\alpha-x_{min}}\cdot\frac{1-\alpha-x_{min}}{1-\alpha-x_{min}+t_{max}-\alpha}+\right.$$

$$\left.\frac{\int_{\alpha}^{t_{max}}\left(\frac{d}{dx}f(x)\right)dx}{t_{max}-\alpha}\cdot\frac{t_{max}-\alpha}{1-\alpha-x_{min}+t_{max}-\alpha}\right) =$$

$$\max_f g\left(\lambda, \frac{\int_{x_{min}}^{1-\alpha}\left(\frac{d}{dx}f(x)\right)dx + \int_{\alpha}^{t_{max}}\left(\frac{d}{dx}f(x)\right)dx}{1-2\alpha-x_{min}+t_{max}}\right)$$

$$\max_f \lambda\left(\frac{f(1-\alpha)-f(x_{min})+f(t_{max})-f(\alpha)}{1-2\alpha-x_{min}+t_{max}}\right) =$$

$$\max_f \lambda\left(\frac{1-2\alpha-f(x_{min})+f(t_{max})}{1-2\alpha-x_{min}+t_{max}}\right)$$

g represents gradients.

The following illustrates ratio-average flanks gradient in the above activation optimization. In an embodiment, the ratio-average flanks gradients is an average gradient involving two flank gradients that are ratio-averaged. In an embodiment, a piecewise linear activation function includes three connected linear lines spanning the domain of $x_{min}$ to $t_{max}$ and the range from 0 to 1. The left linear piece from $x_{min}$ to $1-\alpha$ is associated with a false output, and the center linear piece from $1-\alpha$ to $\alpha$ is associated with fuzzy outputs, and the right linear piece from $\alpha$ to $t_{max}$ is associated with a true output. The gradient of the left linear piece (left flank) is the range of $1-\alpha$ divided by the domain width of $1-\alpha-x_{min}$. The gradient of the right linear piece (right flank) is the range of $1-\alpha$ divided by the domain width $t_{max}-\alpha$.

The domain width ratio of the left linear piece to the sum of the left and right linear piece is $1-\alpha-x_{min}$ divided by the sum of $1-\alpha-x_{min}$ and $t_{max}-\alpha$. Similarly, the domain width ratio of the right linear piece to the sum of the left and right linear piece is $t_{max}-\alpha$ divided by the sum of $1-\alpha-x_{min}$ and $t_{max}-\alpha$.

The ratio-averaged flanks gradient are then the product of the gradient of the left flank $(1-\alpha)/(1-\alpha-x_{min})$ with the domain width ratio of the left flank, plus the product of the gradient of the right flank $(1-\alpha)/(t_{max}-\alpha)$ with the domain width ratio of the right flank.

The derived optimization function, $$\max_f \lambda\left(\frac{1-2\alpha-f(x_{min})+f(t_{max})}{1-2\alpha-x_{min}+t_{max}}\right),$$

incorporates maximizing of the function g, and is solved for the threshold-of-truth a value that maximizes the function with respect to expressivity value $\lambda$. In the optimization function, $x_{min}$, $t_{max}$ are known, given or computed as described above.

The neuron arity and the expressivity lambda ($\lambda$) can be specified by a user. In another aspect, the neuron arity and the expressivity lambda ($\lambda$) can be predefined. The disclose system and/or method can then automatically optimize alpha via the activation objective. Knowing arity, lambda ($\lambda$) and alpha ($\alpha$), the logical neuron can be fully instantiated, ready for learning of the weights. As weights adapt over time, the expressivity lambda ($\lambda$) can be recalculated to make accommodation for greater expressivity required in current weights, alpha ($\alpha$) can be re-optimized when lambda ($\lambda$) changes (responsive to lambda ($\lambda$) changing).

The above formula optimizes capacity and machine learning (gradients) of real-valued logic circuits or gates. The function g combines two values of interest, the expressivity and the ratio-averaged flanks gradient of the 3-piece linear rectified activation function. In an embodiment the function g can be the multiplication between the expressivity $\lambda$ and the gradient quality. The ratio-averaged flanks gradient multiplies the gradient to the ratio of each flank section width of the 3-piece linear rectified activation function to the full operating range, to obtain ratio-averaging where a thin flank section contributes less to the gradient quality measure. The activation function f that maximizes the product of expressivity and gradient quality is then determined through the above formula, which provides logical neurons with an activation function that can support weights of different magnitudes up to the expressivity $\lambda$ while also providing relatively non-small gradients over the entire operating range of the logical neuron.

In an embodiment, the above activation objective can be written in terms of lambda ($\lambda$), alpha ($\alpha$) and arity alone. The activation objective scalar output can be calculated, if given lambda ($\lambda$), alpha ($\alpha$) and arity, which indicates a relative number of the expressivity and gradient quality. Arity can be pre-specified for a logical neuron design, and the maximum expressivity lambda ($\lambda$) that the user would like to have supported by the logical neuron can also be specified. When given lambda ($\lambda$) and arity this leaves threshold-of-truth alpha ($\alpha$) as the dependent parameter that can be chosen to maximize the activation objective, where this choice can be automatically determined.

In another aspect, an interface such as a user interface (e.g., shown in FIG. 9) can be provided that provides or visualizes, e.g., a 2-Dimensional (2D) plot of lambda versus alpha for a given arity, where a combination of lambda and alpha can be chosen that maximizes the activation objective. FIG. 9, for example, shows a contour plot of activation objective scalar output values, calculated for an input triplet (arity, lambda, alpha) that are specified via the axes and a single arity choice. Similar plots can be generated to have higher value choices for arity. A graphical user interface may visualize such plots, allowing a user to be able to choose a combination of lambda and alpha that maximizes the activation objective.

Figure 3:
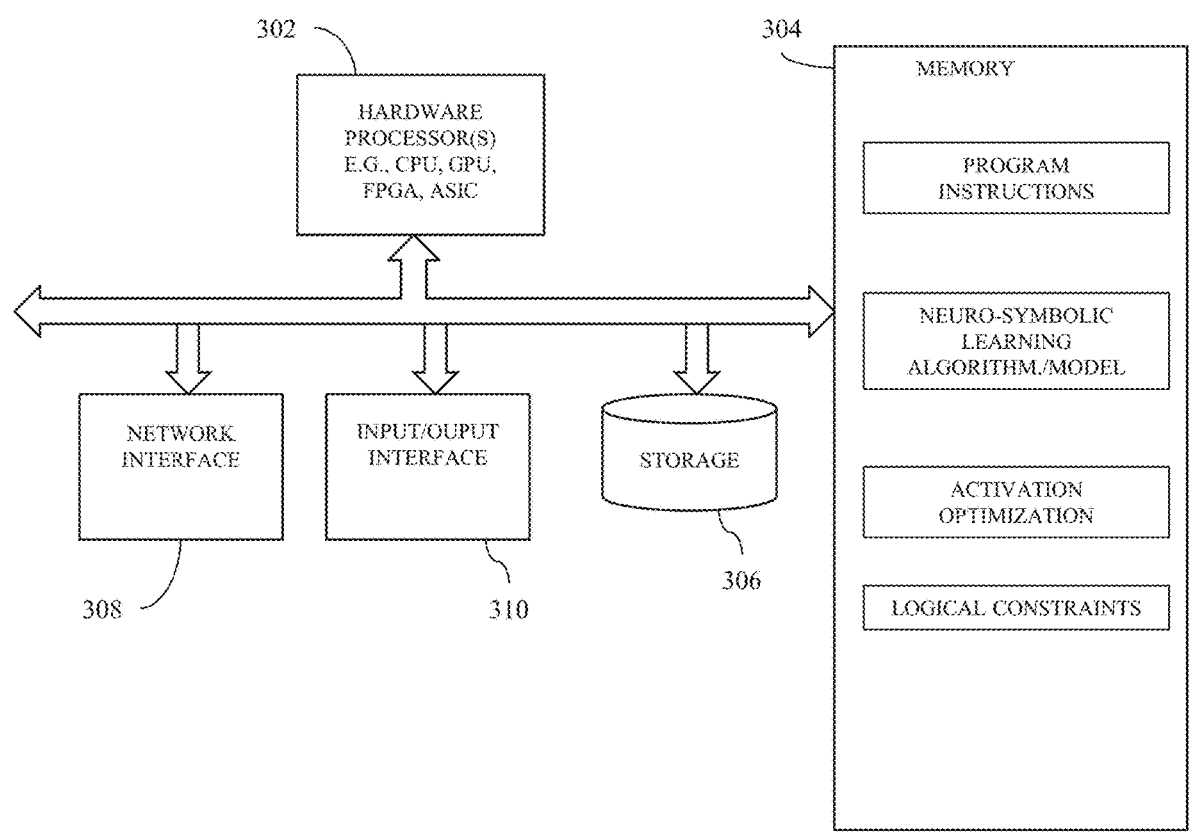
FIG. 3 is a diagram showing components of a system in one embodiment which may provide for optimizing capacity and learning of weighted real-value logic.

FIG. 3 is a diagram showing components of a system in one embodiment which may provide for optimizing capacity and learning of weighted real-value logic. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304. A memory device 304 may include random access memory (RAM), read-only memory (ROM) or another memory device, and may store data and/or processor instructions for implementing various functionalities associated with the methods and/or systems described herein. One or more processors 302 may execute computer instructions stored in memory 304 or received from another computer device or medium. A memory device 304 may, for example, store instructions and/or data for functioning of one or more hardware processors 302, and may include an operating system and other program of instructions and/or data. For instance, at least one hardware processor 302 may determine the threshold-of-truth (alpha), activation function and logical constraints (e.g., convex optimization linear program) of weighted real-valued logic operators and/or logical neurons (e.g., weighted offset Łukasiewicz real-valued strong conjunction or disjunction operators) to optimize the functional gradients of the activation function for a given maximum expressivity (e.g., defined by the ratio between the maximum and minimum input weights) and operator size or arity. In an aspect, input data may be stored in a storage device 306 or received via a network interface 308 from a remote device, and may be temporarily loaded into a memory device 304 for optimizing capacity and learning of weighted real-value logic. The learned weighted real-value logic may be stored on a memory device 304, for example, for performing prediction or inference. One or more hardware processors 302 may be coupled with interface devices such as a network interface 308 for communicating with remote systems, for example, via a network, and an input/output interface 310 for communicating with input and/or output devices such as a keyboard, mouse, display, and/or others.

Figure 4:
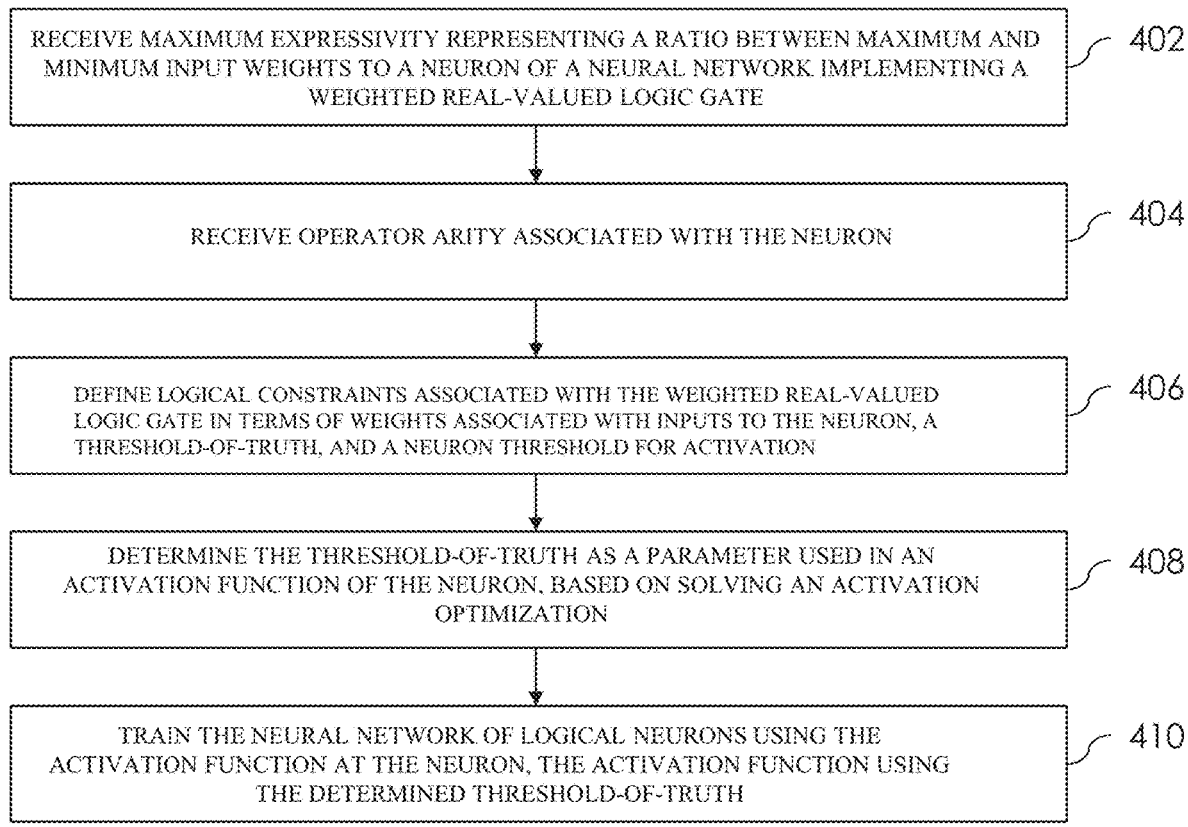
FIG. 4 is a flow diagram illustrating a method in an embodiment.

FIG. 4 is a flow diagram illustrating a method in one embodiment. One or more processors, e.g., hardware processors can execute or run the method described herein. The method can learn weighted real-valued logic implemented in a neural network of logical neurons. At 402, the method can include receiving maximum expressivity representing a ratio between maximum and minimum input weights to a neuron of a neural network implementing a weighted real-valued logic gate. At 404, the method can include receiving operator arity associated with the neuron.

At 406, the method can include defining logical constraints associated with the weighted real-valued logic gate in terms of weights associated with inputs to the neuron, a threshold-of-truth, and a neuron threshold for activation. At 408, the method can include determining the threshold-of-truth as a parameter used in an activation function of the neuron. The threshold-of-truth can be determined by solving an activation optimization formulated based on the logical constraints. The activation optimization maximizes a product of expressivity representing a distribution width of input weights to the neuron and gradient quality for the neuron given the operator arity and the maximum expressivity. In an embodiment, the gradient quality is a relative scalar measure, which can be expressed in terms of ratio-averaged flanks gradient. The ratio-averaged flanks gradient can be determined as described above. At 410, the method can include training the neural network of logical neurons using the activation function at the neuron, the activation function using the determined threshold-of-truth.

In an embodiment, the activation function can be a sigmoid function. In another embodiment, the activation function can be a 3-piece leaky rectified linear unit (ReLU). Other activation functions can be used or selected.

In an embodiment, the method can include defining or deriving using the defined logical constraints, a lower bound on the neuron threshold, an upper bound on the neuron threshold, a lower bound on the neuron's input representing a minimum point of an operating range of the neuron, a lower bound on minimum input weight in terms of the expressivity, operator arity and the threshold-of-truth, a logical bandwidth representing a width of the operating range of the activation function of the neuron, ad an upper bound on the expressivity. The activation optimization can be formulated based on the lower bound on the neuron threshold, the upper bound on the neuron threshold, the lower bound on the neuron's input, the lower bound on minimum input weight, the logical bandwidth and the upper bound on the expressivity. The activation optimization can be derived in terms of the expressivity, the threshold-of-truth, the lower bound on the neuron's input and the upper bound of the maximum input expected for the neuron activation.

The method may also include continually updating the activation function for the threshold-of-truth value to optimize gradients of the activation function over a logical operating range by forming a piecewise linear function that is false at an operating range minimum, at threshold-of-falsity for a threshold-of-falsity input, at threshold-of-truth for a threshold-of-truth input, and true at the operating range maximum.

The method can also include introducing a slack variable associated with the neuron's input to allow the neuron's input to be removed without requiring higher expressivity. In an embodiment, the sum of the input weights to the neuron can be determined given only a minimum weight and the expressivity. In embodiment, the threshold-of-truth can be updated based on a current expressivity. In an embodiment, the method can also include visualizing properties of the weighted real-valued logic gate.

Figure 8:
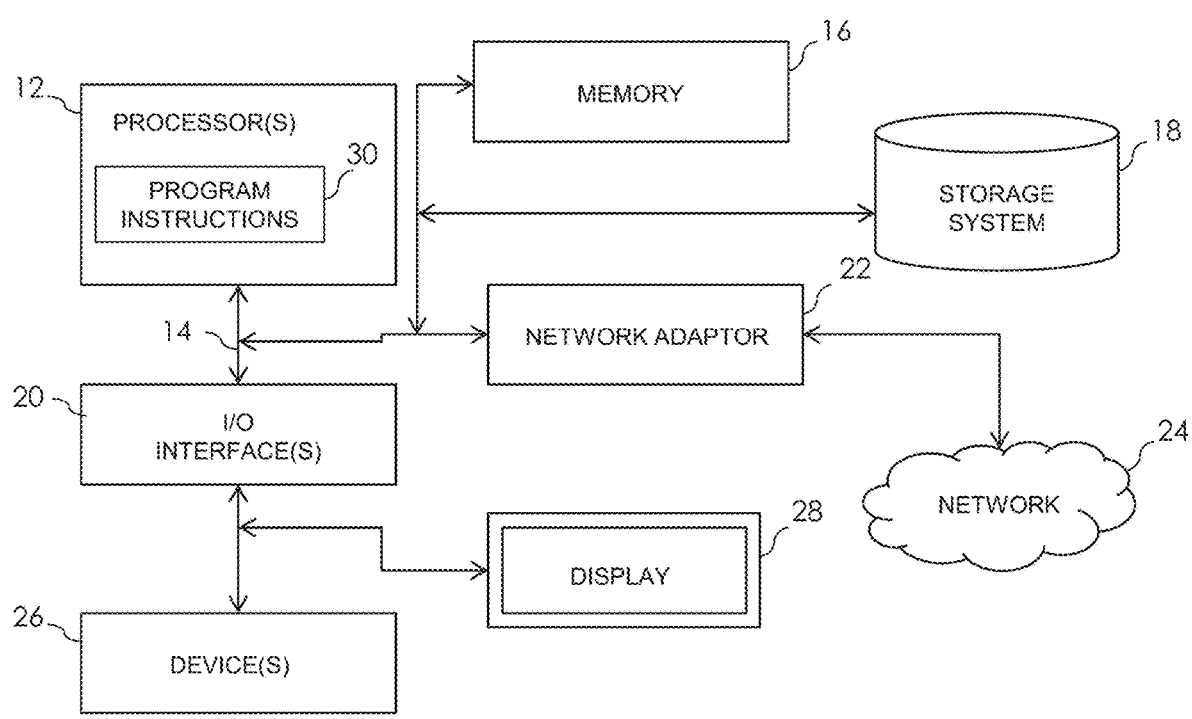
FIG. 8 illustrates a schematic of an example computer or processing system that may implement a system according to one embodiment.

FIG. 8 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from α computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of learning of weighted real-valued logic implemented in a neural network of logical neurons, comprising:
    receiving maximum expressivity representing a ratio between maximum and minimum input weights to a neuron of a neural network implementing a weighted real-valued logic gate;
    receiving operator arity associated with the neuron;
    defining logical constraints associated with the weighted real-valued logic gate in terms of weights associated with inputs to the neuron, a threshold-of-truth, and a neuron threshold for activation;
    determining the threshold-of-truth as a parameter used in an activation function of the neuron, based on solving an activation optimization formulated based on the logical constraints, the activation optimization maximizing a product of expressivity representing a distribution width of input weights to the neuron and gradient quality for the neuron given the operator arity and the maximum expressivity; and
    training the neural network of logical neurons using the activation function at the neuron, the activation function using the determined threshold-of-truth.

2. The method of claim 1, wherein the activation function includes a sigmoid function.

3. The method of claim 1, wherein the activation function includes a 3-piece leaky rectified linear unit (ReLU).

4. The method of claim 1, further including, based on the defined logical constraints, defining a lower bound on the neuron threshold;
    defining an upper bound on the neuron threshold;
    defining a lower bound on the neuron's input representing a minimum point of an operating range of the neuron;
    defining a lower bound on minimum input weight in terms of the expressivity, operator arity and the threshold-of-truth;
    defining a logical bandwidth representing a width of the operating range of the activation function of the neuron;
    defining an upper bound on the expressivity,
    wherein the activation optimization is formulated based on the lower bound on the neuron threshold, the upper bound on the neuron threshold, the lower bound on the neuron's input, the lower bound on minimum input weight, the logical bandwidth and the upper bound on the expressivity.

5. The method of claim 4, wherein the activation optimization is derived in terms of the expressivity, the threshold-of-truth, the lower bound on the neuron's input and the upper bound of the maximum input expected for the neuron activation.

6. The method of claim 1, further including continually updating the activation function for the threshold-of-truth value to optimize gradients of the activation function over a logical operating range by forming a piecewise linear function that is false at an operating range minimum, at threshold-of-falsity for a threshold-of-falsity input, at threshold-of-truth for a threshold-of-truth input, and true at the operating range maximum.

7. The method of claim 1, further including introducing a slack variable associated with the neuron's input to allow the neuron's input to be removed without requiring higher expressivity.

8. The method of claim 1, wherein sum of the input weights to the neuron is determined given only a minimum weight and the expressivity.

9. The method of claim 1, wherein the threshold-of-truth is updated based on a current expressivity.

10. The method of claim 1, further including visualizing properties of the weighted real-valued logic gate.

11. A computer program product comprising a computer readable storage medium having program instructions embodied therewith, the program instructions executable by a device to cause the device to:
receive maximum expressivity representing a ratio between maximum and minimum input weights to a neuron of a neural network implementing a weighted real-valued logic gate;
receive operator arity associated with the neuron;
define logical constraints associated with the weighted real-valued logic gate in terms of weights associated with inputs to the neuron, a threshold-of-truth, and a neuron threshold for activation;
determine the threshold-of-truth as a parameter used in an activation function of the neuron, based on solving an activation optimization formulated based on the logical constraints, the activation optimization maximizing a product of expressivity representing a distribution width of input weights to the neuron and gradient quality for the neuron given the operator arity and the maximum expressivity; and
train the neural network of logical neurons using the activation function at the neuron, the activation function using the determined threshold-of-truth.

12. The computer program product of claim 11, wherein the activation function includes a sigmoid function.

13. The computer program product of claim 11, wherein the activation function includes a 3-piece leaky rectified linear unit (ReLU).

14. The computer program product of claim 11, wherein the device is caused to, based on the defined logical constraints,
define a lower bound on the neuron threshold;
define an upper bound on the neuron threshold;
define a lower bound on the neuron's input representing a minimum point of an operating range of the neuron;
define a lower bound on minimum input weight in terms of the expressivity, operator arity and the threshold-of-truth;
defining a logical bandwidth representing a width of the operating range of the activation function of the neuron;
define an upper bound on the expressivity,
wherein the activation optimization is formulated based on the lower bound on the neuron threshold, the upper bound on the neuron threshold, the lower bound on the neuron's input, the lower bound on minimum input weight, the logical bandwidth and the upper bound on the expressivity.

15. The computer program product of claim 14, wherein the activation optimization is derived in terms of the expressivity, the threshold-of-truth, the lower bound on the neuron's input and the upper bound of the maximum input expected for the neuron activation.

16. The computer program product of claim 11, wherein the device is further caused to continually update the activation function for the threshold-of-truth value to optimize gradients of the activation function over a logical operating range by forming a piecewise linear function that is false at an operating range minimum, at threshold-of-falsity for a threshold-of-falsity input, at threshold-of-truth for a threshold-of-truth input, and true at the operating range maximum.

17. The computer program product of claim 11, wherein the device is further caused to introduce a slack variable associated with the neuron's input to allow the neuron's input to be removed without requiring higher expressivity.

18. The computer program product of claim 11, wherein sum of the input weights to the neuron is determined given only a minimum weight and the expressivity.

19. The computer program product of claim 11, wherein the threshold-of-truth is updated based on a current expressivity.

20. A system comprising:
a hardware processor; and
a memory device coupled with the hardware processor,
the hardware processor configured to at least:
receive maximum expressivity representing a ratio between maximum and minimum input weights to a neuron of a neural network implementing a weighted real-valued logic gate;
receive operator arity associated with the neuron;
define logical constraints associated with the weighted real-valued logic gate in terms of weights associated with inputs to the neuron, a threshold-of-truth, and a neuron threshold for activation;
determine the threshold-of-truth as a parameter used in an activation function of the neuron, based on solving an activation optimization formulated based on the logical constraints, the activation optimization maximizing a product of expressivity representing a distribution width of input weights to the neuron and gradient quality for the neuron given the operator arity and the maximum expressivity; and
train the neural network of logical neurons using the activation function at the neuron, the activation function using the determined threshold-of-truth.

* * * * *